United States Patent
Serebrin et al.

(10) Patent No.: US 10,261,700 B1
(45) Date of Patent: Apr. 16, 2019

(54) METHOD AND APPARATUS FOR STREAMING BUFFERING TO ACCELERATE READS

(71) Applicant: GOOGLE INC., Mountain View, CA (US)

(72) Inventors: Benjamin Charles Serebrin, Mountain View, CA (US); Trevor Bunker, Mountain View, CA (US); Timothy Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 15/247,632

(22) Filed: Aug. 25, 2016

Related U.S. Application Data

(60) Provisional application No. 62/210,828, filed on Aug. 27, 2015.

(51) Int. Cl.
*G06F 3/06* (2006.01)
*G06F 12/0802* (2016.01)

(52) U.S. Cl.
CPC .......... *G06F 3/0613* (2013.01); *G06F 3/0656* (2013.01); *G06F 3/0679* (2013.01); *G06F 12/0802* (2013.01); *G06F 2212/1016* (2013.01); *G06F 2212/152* (2013.01); *G06F 2212/214* (2013.01)

(58) Field of Classification Search
None
See application file for complete search history.

(56) References Cited

U.S. PATENT DOCUMENTS

| | | | |
|---|---|---|---|
| 4,309,755 A | * | 1/1982 | Lanty ............... H04M 9/003 710/21 |
| 10,126,966 B1 | | 11/2018 | Serebrin et al. |
| 10,133,497 B1 | | 11/2018 | Serebrin et al. |

(Continued)

FOREIGN PATENT DOCUMENTS

| | | | | |
|---|---|---|---|---|
| WO | 2017046789 | | 3/2017 | |
| WO | WO-2017046789 A1 | * | 3/2017 | ............. G06F 21/56 |

OTHER PUBLICATIONS

Vaid, "Microsoft's Project Olympus delivers cloud hardware innovation at scale", https://azure.microsoft.com/en-us/log/microsofts-project-olympus-delivers-cloud-hardware-innovation-at-scale/, Nov. 8, 2017, 6 pages.

(Continued)

*Primary Examiner* — Michael Alsip
(74) *Attorney, Agent, or Firm* — Colby Nipper

(57) ABSTRACT

A method of accessing data in a non-volatile memory device is disclosed. The method includes serially receiving a command having an address in a virtual address space. When the address maps to the buffer in memory, the address may be matched to the address to one of a plurality of segments in buffer memory. Data may be moved from internal EEPROM/Flash memory to a segment of the plurality of segments of the buffer memory for an address range in the virtual address space that is likely to be read. A physical address may be generated within the buffer memory based on the address. Data may be fetched in the buffer memory based on the generated address and then a response for the command may be transmitted that includes the fetched data.

20 Claims, 9 Drawing Sheets

(56) References Cited

U.S. PATENT DOCUMENTS

| | | | | |
|---|---|---|---|---|
| 2007/0115743 | A1* | 5/2007 | Sartori | G06F 13/4282 |
| | | | | 365/221 |
| 2010/0007377 | A1* | 1/2010 | Hing | G11C 7/1045 |
| | | | | 326/38 |
| 2012/0255010 | A1* | 10/2012 | Sallam | G06F 21/572 |
| | | | | 726/24 |
| 2018/0225230 | A1* | 8/2018 | Litichever | G06F 21/56 |

OTHER PUBLICATIONS

U.S. Appl. No. 15/247,626, filed Aug. 25, 2016.
U.S. Appl. No. 15/247,199, filed Aug. 25, 2016.
"Notice of Allowance", U.S. Appl. No. 15/247,199, dated Sep. 10, 2018, 14 pages.
"Notice of Allowance", U.S. Appl. No. 15/247,626, dated Sep. 14, 2018, 7 pages.

\* cited by examiner

METHOD AND APPARATUS FOR STREAMING BUFFERING TO ACCELERATE READS

This Nonprovisional application claims priority under 35 U.S.C. § 119(e) on U.S. Provisional Application No. 62/210,828 filed on Aug. 27, 2015, the entire contents of which are hereby incorporated by reference.

This application is related to application, U.S. patent application Ser. No. 15/247,626, and application, U.S. patent application Ser. No. 14/247,199, which are hereby incorporated by reference.

BACKGROUND

The present disclosure relates to an approach for improving speed of responding to read commands in an on-chip, non-volatile memory, such as Electrically Erasable Programmable Read Only Memory (EEPROM), or Flash memory, having added security functions. Aspects include an on-chip, non-volatile memory having a front-end buffer for a slave memory. Aspects include an on-chip, non-volatile memory that is capable of performing read commands faster than directly from internal memory and in a manner that is comparable to random-access memory. Aspects include an on-chip, non-volatile memory that is a drop-in replacement for a standard EEPROM/Flash memory in which the master chip is unaware of the added mode.

SUMMARY

This summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

Aspects include a method of accessing data in a non-volatile memory device, including an internal Electronically Erasable Programmable Read Only Memory (EEPROM) or Flash memory and a buffer memory, the method including: serially receiving a command having an address in a virtual address space; when the address maps to the buffer memory, matching the address to one of a plurality of segments in the buffer memory; moving data, for an address range in the virtual address space that is likely to be read, from the internal EEPROM/Flash memory to a segment of the plurality of segments of the buffer memory; and generating a physical address within the buffer memory based on the address; fetching data in the buffer memory based on the generated address; and transmitting a response for the command including the fetched data.

Other aspects include matching the address to one of a plurality of segments in the buffer memory by matching the address to values in one or more registers, where the registers identify segments in the buffer memory.

Further aspects include: the values in said one or more registers include a base, a limit, and an offset, the base and limit values correspond to a range of addresses for a respective said segment, and the offset is for generating an address within the buffer memory.

Still further aspects include: a segment of the buffer memory is marked as a revolving access, and data is fetched from the internal EEPROM/Flash memory into the segment to fill in where data is read out of the segment, and when the end of the segment has been reached during read, the fetching in accordance with the command continues from the beginning of the segment.

Still further aspects include: when a segment of the buffer memory is marked as an incremental access, data is fetched from the internal EEPROM/Flash memory into the segment by incrementing the virtual address.

Yet further aspects include: in a case that the address does not match to a register, creating an address trace including the address that was not matched, and in a subsequent step of receiving a read command, predicting the address based on the stored address trace, and moving data based on the predicted address from the internal EEPROM/Flash memory to the buffer memory.

In another embodiment, an Electronically Erasable Programmable Read Only Memory (EEPROM) or Flash memory chip configured to respond to a command having an associated address in a virtual address space, may include: an on-chip controller; an internal EEPROM/Flash memory device; an on-chip Random Access Memory (RAM) divided into a plurality of segments; a plurality of registers, each register storing address information for a respective segment of the plurality of segments, the on-chip RAM is a buffer memory for the internal EEPROM/Flash memory device, when the address maps to the buffer memory, said controller performs matching the address to one of the plurality of segments in the buffer memory; moving data, for an address range in the virtual address space that is likely to be read, from the internal EEPROM/Flash memory to a segment of the plurality of segments of the buffer memory; and generating a physical address within the buffer memory based on the address; fetching data in the buffer memory based on the generated address; and transmitting a response for the command including the fetched data.

In additional aspect, a Serial Peripheral Interface (SPI) and an SPI master may be included, wherein the internal EEPROM/Flash memory device is an SPI slave device.

In further aspects, the controller for the on-chip RAM and the registers is firmware.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

These and other aspects are described with respect to the drawings. The teachings of the disclosed application can be readily understood by considering the following detailed description in conjunction with the accompanying drawings.

The figures depict embodiments of the disclosed invention for purposes of illustration only. One skilled in the art will recognize from the following discussion that alternative embodiments of the structures and methods illustrated herein may be employed without departing from the principles described herein.

DETAILED DESCRIPTION

The following description refers to the accompanying drawings. The following description is not intended to limit the scope. Instead, the scope is defined by the appended claims.

<Acronyms>

MISO—Master Input, Slave Output (Output from Slave device).

MOSI—Master Output, Slave Input (output from Master).

SPI—Serial Peripheral Interface.

EEPROM—Electronically Erasable Programmable Read Only Memory.

FIFO—First In First Out.

<Main Memory System>

Among types of non-volatile memory devices, an EEPROM is a type of memory device that is compact and is generally faster than conventional disk drives. A relatively inexpensive type of EEPROM is a serial EEPROM having a serial input. A serial EEPROM can interface with a serial bus, such as Serial Peripheral Interface (SPI). Devices may communicate over a bus using master-slave architecture. In the case of EEPROM, a master device communicates with one or more slave memory devices.

Other types of non-volatile memory devices include Flash memory, as well as memory device technology under development, such as Magnetoresistive Random-access Memory (MRAM), Spin-transfer Torque Magnetic Random-access Memory (STT-RAM, Thermal Assisted Switching Magnetic Random-access Memory (TAS-MRAM), and Phase-change Memory (PCM). Various aspects apply to these and other types of on-chip, non-volatile memory devices. As used herein, chip refers to a single integrated circuit package, and on-chip refers to circuits, or functional components, integrated in the same package as other circuits.

Figure 2:
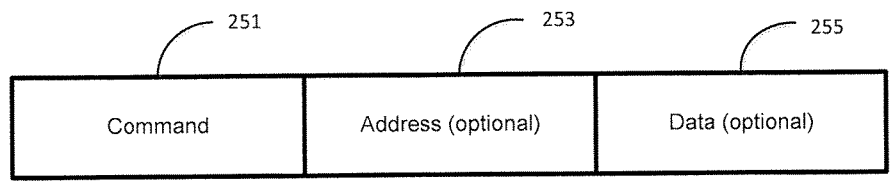
FIG. 2 is a table showing a command format.

A command that is sent to a slave memory device is a bit-serial stream that includes bits representing the command, followed by an optional address, followed by optional write data, followed immediately by an optional read response returned by the slave device. The bit-serial stream may be sent most significant bit first, least significant bit first, or by any other encoding. An exemplary format of a command is shown in FIG. 2. The command format includes Command 251, Address 253 (optional), Data 255 (optional). The command 251 may be an 8-bit command, but may also be other sizes, such as 16-bit.

A serial EEPROM memory device may function as a main non-volatile memory device in a memory system. However, the serial EEPROM memory device has lower transfer rates than other types of EEPROM, such as a parallel EEPROM. It would be beneficial to improve the transfer rate of a serial EEPROM in order to enhance its capability as a main non-volatile memory device, and without significant cost impact.

An aspect is a non-volatile memory device, such as a serial EEPROM or Flash memory device, that includes an internal Flash memory (or a comparable on-chip non-volatile memory device), access to an external Flash memory (or a comparable non-volatile memory device) and an on-chip RAM. The on-chip RAM serves as a buffer to increase the speed of reads over that of reads from internal Flash memory. For example, in a case where the serial EEPROM or Flash memory, or other type of non-volatile memory, is configured as a main non-volatile memory device, on boot, data from byte 0 of the internal Flash memory (or comparable on-chip, non-volatile memory device) may instead be read from the buffer. Other regularly needed data may be transferred from internal Flash memory (or comparable on-chip, non-volatile memory) to the buffer as well, and subsequently read from the buffer memory instead of from the internal Flash memory (or comparable on-chip, non-volatile memory). Segment registers may point to addresses in the on-chip RAM. These addresses pointed to by the segment registers may be changeable by software.

<Secure Memory Device>

In a serial EEPROM memory device functioning as a main non-volatile memory device, there may be a need for security, such as authentication, as a level of protection. However, in the case of any interface, such as SPI, the transfer protocol requirements must be followed. Subsequently, there is a need for a secure non-volatile memory, such as an EEPROM memory device, that meets the requirements of the interface protocol.

Figure 1:
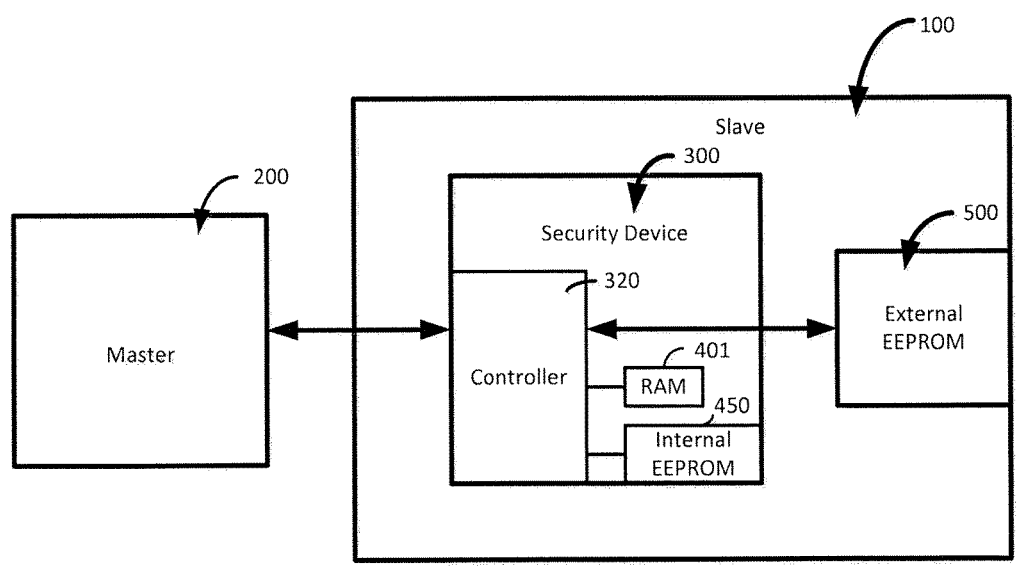
FIG. 1 is a block diagram for an EEPROM system.

FIG. 1 is a block diagram for a secure memory system that may be a replacement for a standard EEPROM or Flash memory device. The secure memory system may communicate by way of a bus that connects a Master 200 to a Slave device 100. The Slave device 100 may be an integrated circuit, or chip, and may include a security device 300 in addition to an on-chip Internal EEPROM/Flash memory 450, and an associated controller 320. The controller 320 may be a microcontroller that controls firmware. In addition, the Slave device 100 can be expanded to include an External EEPROM/Flash memory 500, as well as an on-chip RAM 401. As used herein, EEPROM/Flash refers to EEPROM and/or Flash memory.

Provided the configuration of the secure memory system as shown in FIG. 1, read commands may be processed differently, depending on which of the storage devices is being addressed. The controller 320 may activate one of the RAM 401, Internal EEPROM/Flash memory 450, or External EEPROM/Flash memory 500 depending on the address.

In an EEPROM/Flash memory device functioning as a main non-volatile memory device, a virtual address range may be reserved for the device. The virtual address range may be divided into pages. In an example embodiment, each page may be 512B. The Internal EEPROM/Flash memory 450 and External EEPROM/Flash memory 500 may each be provided with a base page register and a limit page register. The virtual address within the range marked out by the register pair delineates the continuous virtual space owned by the segment. The on-chip RAM 401 may contain a base page register and a limit page register to match distinct pages.

Figure 3:
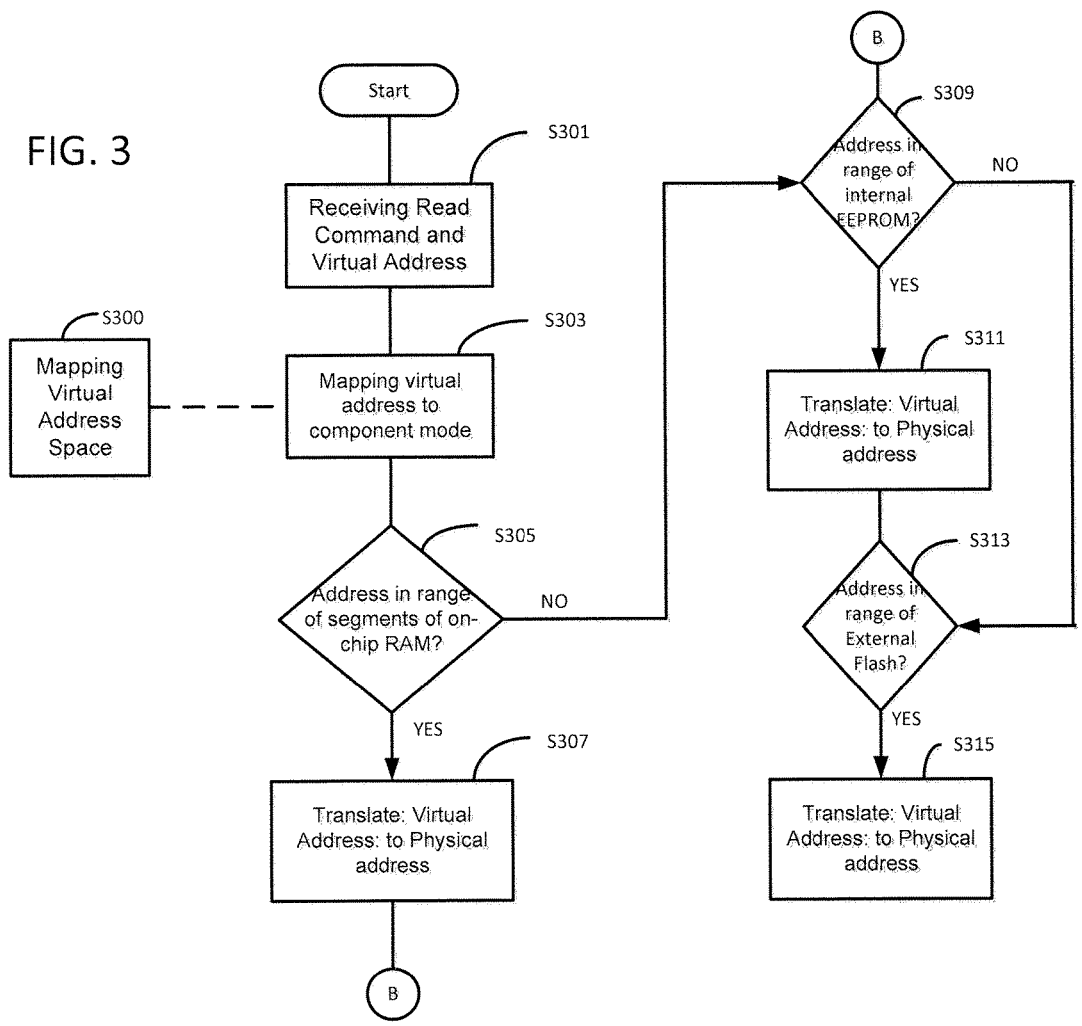
FIG. 3 is a flowchart for address processing in the EEPROM system of FIG. 1.

FIG. 3 is a flowchart for address processing in the EEPROM or Flash memory device in FIG. 1. The EEPROM or Flash memory device is configured to handle a normal read (0x03) command. The normal read command has no wait state between command/address phase and data return phase. RAMs and ROMs cannot tell a master to wait so data must return on time. Subsequently, normal read commands mapped to Internal EEPROM/Flash memory 450 include special hardware handling to ensure that read data can be returned in time. At step S300, the virtual address space allocated to the EEPROM or Flash memory device is established.

For normal read commands mapped to on-chip RAM 401, the on-chip RAM 401 is capable of handling the protocol's wait states, for example 0. For normal read commands mapped to External EEPROM/Flash memory 500, the command is simply forwarded.

At step S301, the normal read command and virtual address is received from the master 200. At step S303, using the base page registers and limit page registers associated with each segment, a determination is made as to which segment, if any, contains the virtual address. In an example embodiment, the virtual addresses of segments may overlap. In such case, the virtual address may fall within a range marked out by more than one pair of register pairs. When overlap occurs, the return data priority may be on-chip RAM>Internal EEPROM/Flash memory>External EEPROM/Flash memory.

At step S305, if the virtual address falls within the range for the on-chip RAM 401 (S305: YES), at step S307, the virtual address is translated to a physical address. In an example embodiment, the on-chip RAM 401 may store a maximum of 2 KB, with a maximum per page size of 512B. In this example embodiment, the on-chip RAM 401 is divided into four segments. In this example embodiment, page 0 of physical space in RAM 401 may be mapped to page 0 of the virtual address. Also, page 1 of physical space in RAM 401 may be mapped to page 1 of the virtual address. Page 2 may be mapped to page 0x800 of the virtual address. Page 3 may be mapped to page 0x801 of the virtual address. Alternatively, the virtual address is translated into a physical address in parallel with step S303 of determining which segment maps to the virtual address.

As an example of address translation, a virtual address 0x0000_0348 may be translated to Physical address 0x348 in virtual page number 0x1.

At step S309, if the virtual address falls within the range for Internal EEPROM/Flash memory 450 (S309: YES), at step S311, the virtual address is translated to a physical address in the Internal EEPROM/Flash memory 450. At step S313, if the virtual address falls within the range for External EEPROM/Flash memory 500 (S313: YES), at step S315, the virtual address is translated to a physical address in the External EEPROM/Flash memory 500. In each step S305 and S309, in the case of NO, the associated translation step is skipped. At step S313, if the virtual address does not fall into the range of the external flash (S313: NO), an error message is generated to indicate that the address is out of range for the device.

<EEPROM Chip Having Buffers>

An aspect is a Slave device 100 implemented as an EEPROM chip having on-chip RAM 401 functioning as a read-only buffer that operates in the internal clock domain. The read-only buffer may be organized into segments. A set of page registers may manage the segments. In an example embodiment, there is a one-to-one relationship between a page register and associated segment. However, other arrangements are possible. For example, there may be a single register for managing the segments. Alternatively, there may be several registers for managing each segment.

In an example embodiment, the on-chip RAM 401 may contain four sets of page registers, in which the on-chip RAM 401 occupies 2 KB, allowing for a maximum of 512B per page. This arrangement of the on-chip RAM 401 allows matching to four distinct pages that do not need to be contiguous.

Figure 4:
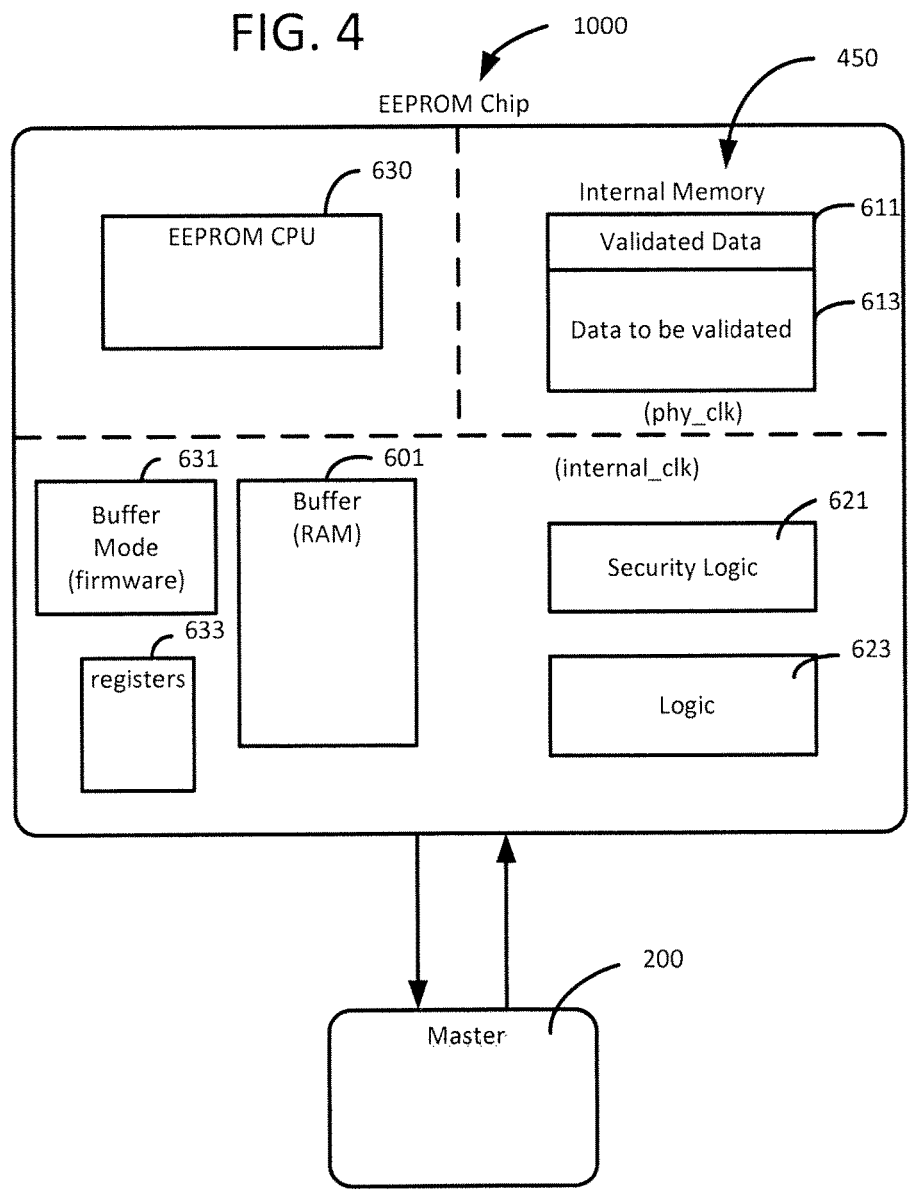
FIG. 4 is a block diagram for an EEPROM chip.

An example EEPROM or Flash memory chip is shown in FIG. 4. The EEPROM or Flash memory chip may include security functions, for example functions that authenticate potentially destructive commands (i.e., write or erase commands). The Internal Memory 450 of the EEPROM/Flash memory chip 1000 may be an EEPROM or Flash memory that operates under its own clock (phy_clock). Data that is initially written to the Internal Memory 450 may be identified as data to be validated 613. Data that has been validated may be identified as validated data 611. In an example embodiment, security logic 621 in the chip 1000 may provide the security functions. Internal control functions may be handled by an EEPROM CPU 630. The CPU may be a microcontroller or a microprocessor, and may work in conjunction with firmware. The logic 623 manages communications with the Master 200 over the bus, and receives clock signals (internal clock) from the Master 200.

The example EEPROM or Flash memory chip 100 may include an on-chip RAM, which functions as a read-only Buffer 601 that may be accessed before the Internal Memory 450, to handle reads in specific address ranges. The buffer 601 may be accessed based on values in one or more registers 633. Logic associated with managing operations between the registers 633, Buffer 601 and Internal Memory 450 may be performed by firmware in a Buffer Mode 631.

Figure 5:
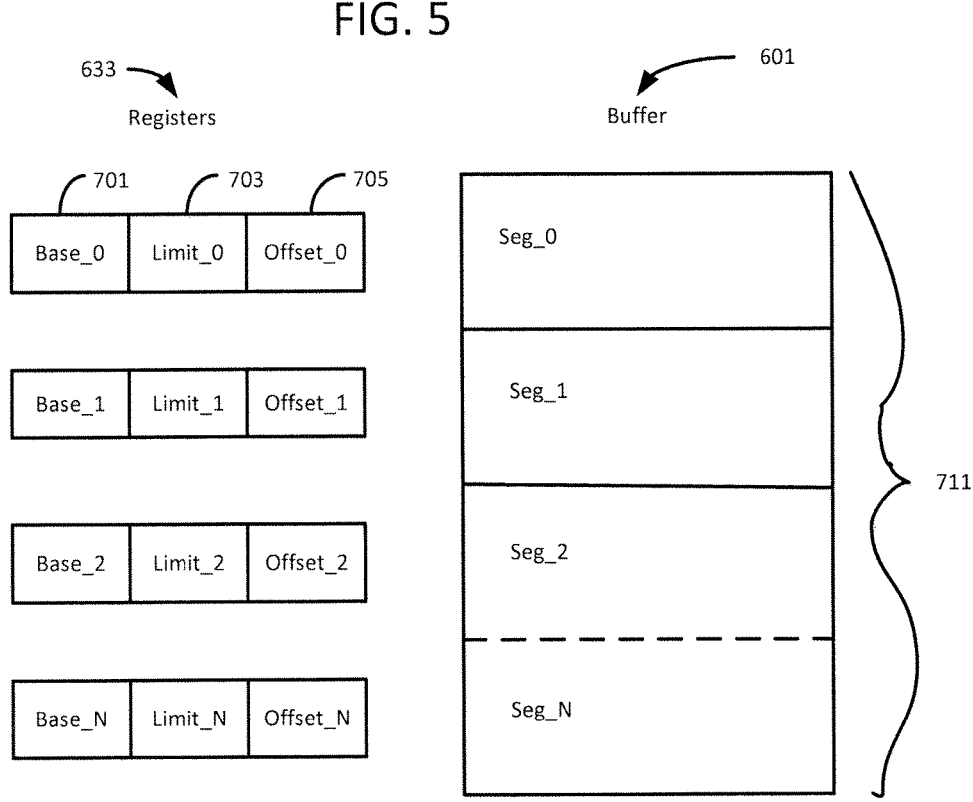
FIG. 5 is a memory arrangement for buffers and associated registers.

FIG. 5 shows an example memory arrangement for registers 633 and buffer 601 (on-chip RAM). The buffer 601 may be divided into N segments 711, in which each segment may store a page previously retrieved from the internal memory 450. In an example embodiment, a register may be associated with one segment in the buffer 601. Each register 633 may include a base field 701, a limit field 703 and an offset field 705, for storing respective values. Alternatively, separate registers may be used to individually store base, limit, and offset values. The base and limit values represent a range of virtual addresses of the internal memory 450 or external memory device 500 that are mirrored in a segment in the buffer. The offset value is used to generate a physical address value within the buffer 601. For example, virtual address range 0x0-0x1000 could be for buffer memory. Virtual address range 0x10000-0x11000 could be for on-chip RAM and virtual address 020000-0x21000 could be for external memory.

<Read Using Buffer>

Figure 6:
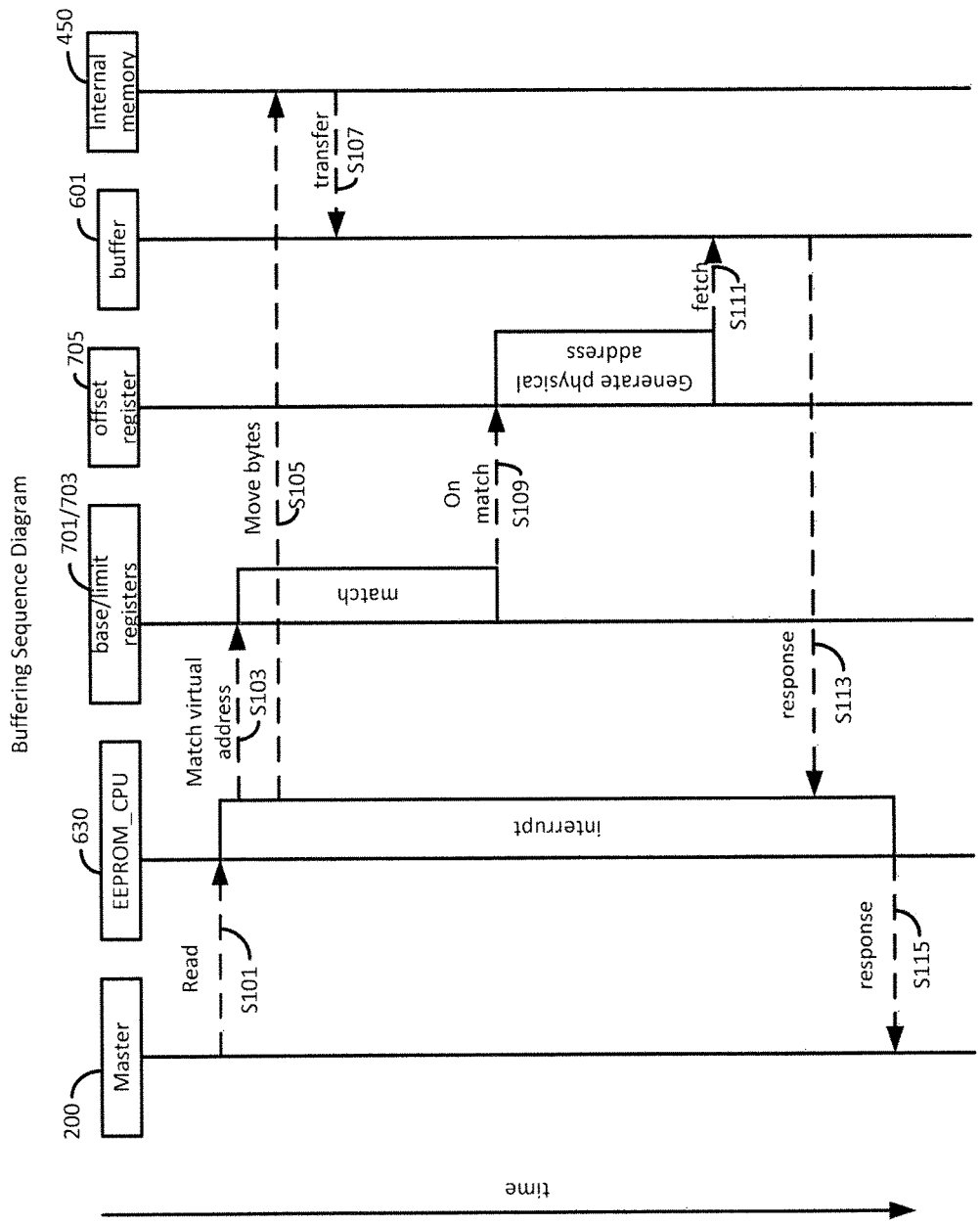
FIG. 6 is a buffering sequence diagram.

FIG. 6 is a sequence diagram for processing read commands using the buffer 601 (on-chip RAM). At step S101, when a read command is received in the EEPROM chip (via MOSI pin), the CPU 630 for the EEPROM sets an interrupt, and controls a match operation. During the match operation or in parallel with the match operation, the virtual address may be translated to a physical address. At step S103, the virtual address associated with the read command is compared against the values in the base and limit fields 701/703. At step S109, when a segment N matches, the value in the offset field 705 of the matching register is added (or subtracted) to the address to generate a physical address within the buffer 601.

In parallel with controlling the match operation, at step S105, the CPU makes a request to the internal memory 450 of the EEPROM to move bytes into the buffer 601. Data that is moved are bytes for address ranges that are known to be read next (for example, during boot, byte 0 is often read). Subsequently, the buffer 601 can have the next bits available before bytes are requested, and the EEPROM will effectively perform fast, random-access reads.

At step S111, the hardware controls a fetch from the buffer segment based on the generated address, and at step S113, the buffer 601 returns the response bytes to the CPU 630. At step S115, the hardware controls transmission of the response bytes to the master (MISO pin) as a response to the read command.

<Mismatches and Address Prediction>

An address of a read command that is within a range to be handled by the on-chip RAM 401 may not match to any register. In the case that the address does not match, the CPU 630 may return a predefined dummy value, such as 0xFF. The CPU 630 can record the address and repeat serially reading and incrementing the address as a known address stream. If at any point the updated address matches a virtual address segment, the buffered data is returned.

An aspect is for the CPU 630 to record the address as a prediction stream and reset the master 200. In an example embodiment, an address trace may be created including the address that was not matched, and the master may be rebooted. Subsequently, the CPU 630 may be configured to predict the address stream based on the stored address trace.

<Operation of On-Chip RAM>

Figure 7:
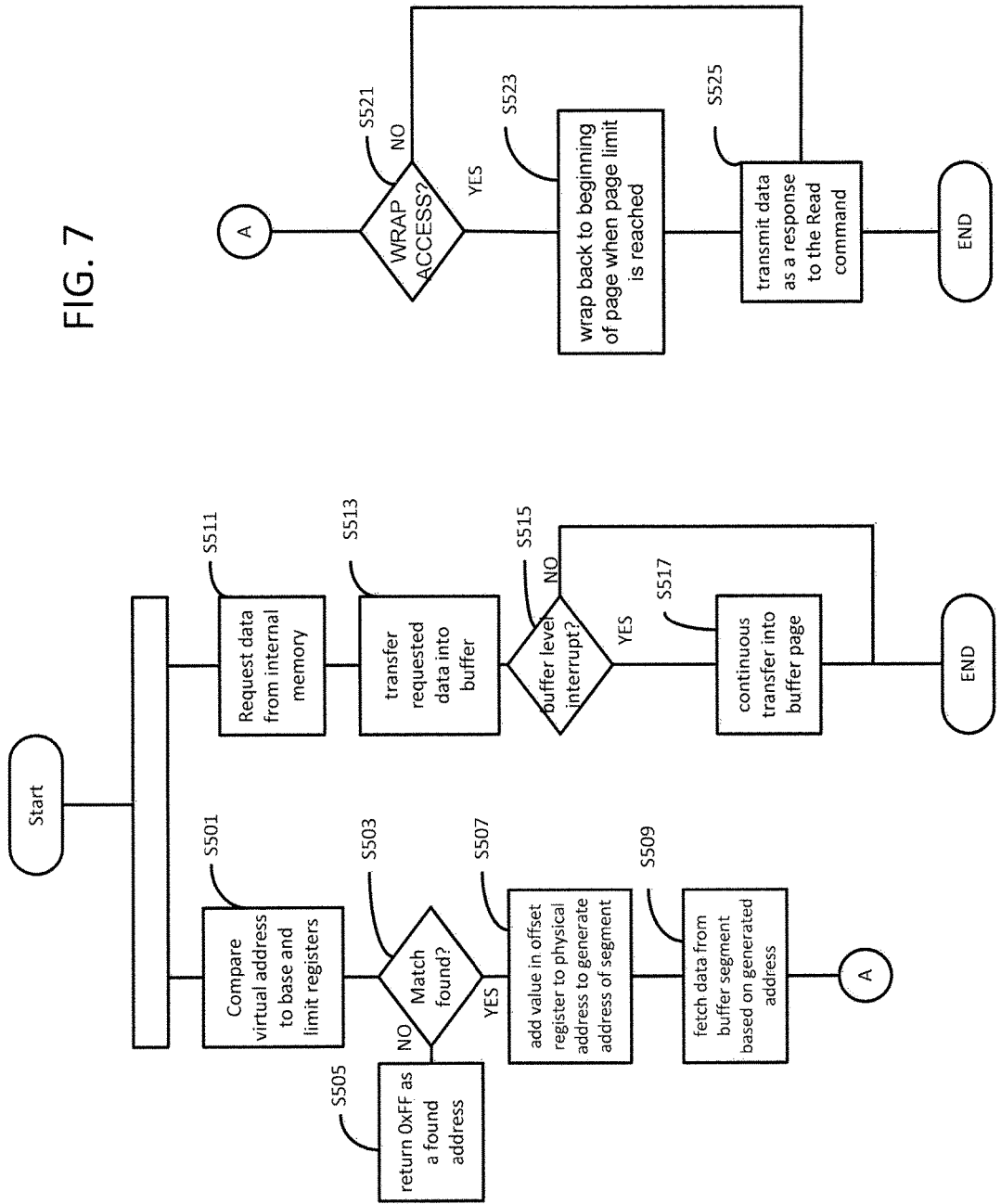
FIG. 7 is a flow chart for read command processing using a buffer mode.

FIG. 7 is a flow chart for read processing in the EEPROM in a case that the Virtual address associated with the read command falls within a range handled by the on-chip RAM. As is shown in FIG. 5, in an example embodiment, the on-chip RAM has 4 sets of page registers, and thus can store 4 distinct and non-contiguous pages.

At step S501, a virtual address is compared to the base 701 and limit 703 registers for each segment 711 to determine which segment, if any, the address falls in. In a case, (Step S503: NO), that the address does not match to any register, addresses of a programmable data sequence (e.g., 0xFF) will be returned as known addresses. Otherwise (Step S503: YES), at step S507 the offset value in the associated offset register 705 is added to the Virtual address to obtain a physical address for the segment 711. A controller may write the registers.

Before the match step S503 is being performed, or before a read command, at step S511, the controller 320 makes a request to fetch data from Internal EEPROM/Flash memory 450. At step S513, requested data is transferred into a segment of the on-chip RAM 401. In an example embodiment, data that is fetched includes bytes for address ranges that are going to be read next (for example, on boot, byte 0 is known to be read). A controller may initiate read requests before setting the address ranges and may populate a buffer memory before writing the registers.

At step S509, data is fetched from the buffer segment and the controller writes address information to the registers. At step S521, a check is made to determine whether the page in the buffer is marked as WRAP_ACCESS or normal Access.

At step S523, a physical page marked as WRAP_ACCESS will be read such that once the end of the page is reached, the read commands wrap back to the beginning of the page. WRAP_ACCESS may be implemented by wrapping the virtual address back to the beginning of the page when the page limit is reached. In the case of a physical page marked as NORMAL_ACCESS, the virtual address is not wrapped back to the beginning of the page, and instead whatever physical address the virtual address translates to is incremented.

Also, the pages can maintain a buffer level interrupt. At step S515: YES, this buffer level interrupt is used in conjunction with WRAP_ACCESS to allow use of one physical page as a cache for a large amount of continuous data. Upon receiving a buffer level interrupt, at step S517 more data is continuously fetched as the page is drained.

When a read command is received, match step S503 is performed to determine if the Physical address falls within a range set forth in a register.

At step S525, data associated with the matching Physical address is fetched from the buffer 601 and is transmitted to the master 200 as the response to the read command.

<Secure Memory System>

As shown in FIG. 1, an aspect of an SPI slave device 100 is a capability of directing input commands to alternative memory components. Generally in an SPI communication system, control signals are issued by an SPI Master and data may be received by the SPI Master. Control signals may be applied to the MOSI line and data signals may be applied to the MISO line. Data may come in from the master or go to the master depending on which command is being executed and whether an example EEPROM is in single or dual mode. In addition, the SPI Master generates a serial clock signal to control timing of communication between the SPI Master and a SPI Slave device.

Figure 8:
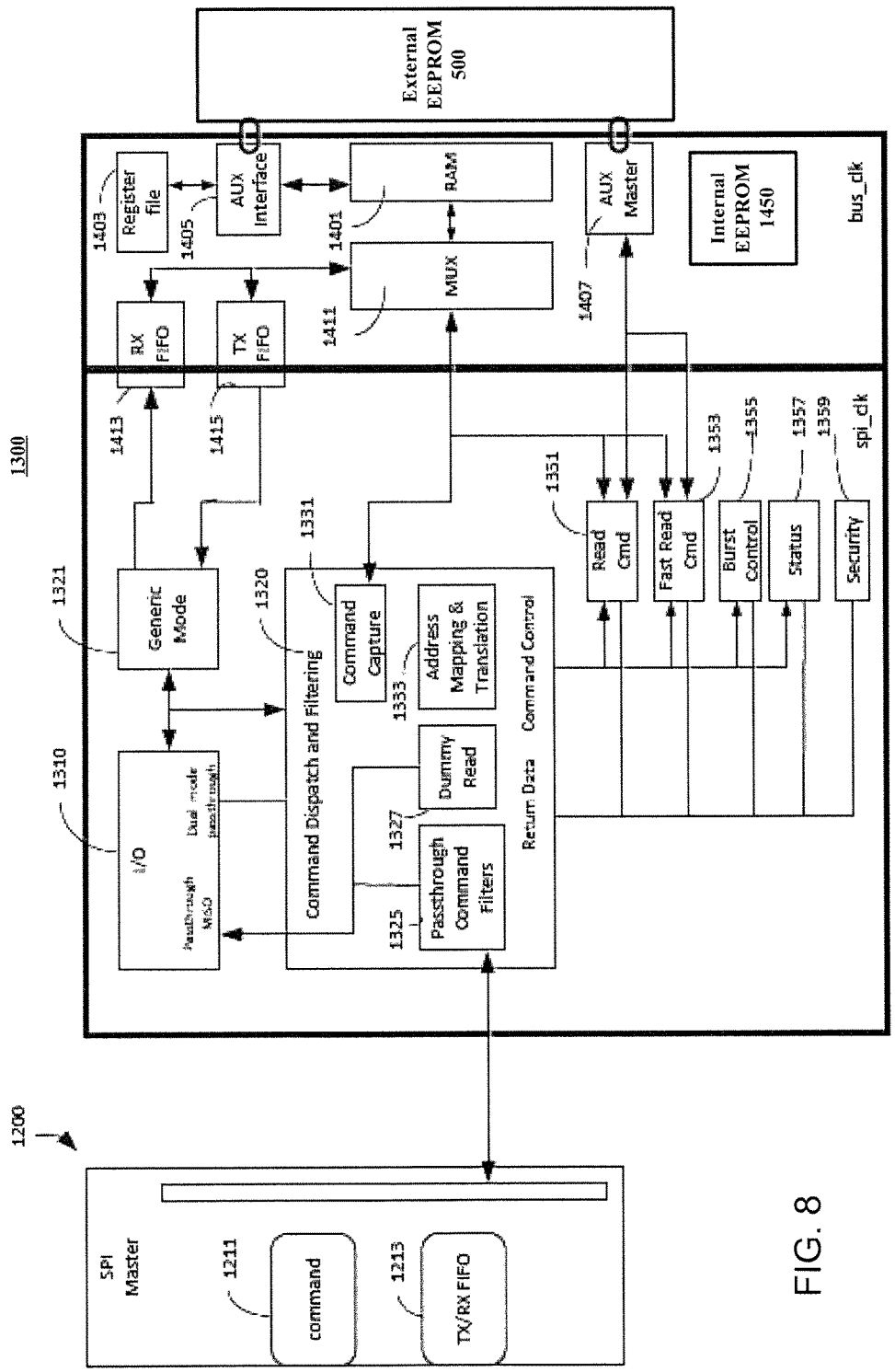
FIG. 8 is an exemplary configuration of an EEPROM system having a security device.

FIG. 8 shows another embodiment of the SPI EEPROM. The SPI EEPROM memory system shown in FIG. 8 is intended to replace a standard SPI EEPROM. An approach to configuring the SPI EEPROM of FIG. 8 may be to use a conventional SPI Master to control communication with a SPI Slave device 1300 that has been enhanced with security functions in firmware. As an alternative, a SPI Slave device 1300 may include functions to operate as a proxy device for an External Slave device such as external EEPROM 500. The example embodiment shown in FIG. 8 provides both of an EEPROM mode and an EEPROM proxy mode in a single device. Alternative modes are enabled by way of command dispatch and filtering functions 1320. In addition, the single device is capable of optional control in dual mode. In dual mode, signals can be provided to the intermediate slave device using both the MISO and the MOSI lines.

The example embodiment in FIG. 8 includes SPI Master device 1200 and SPI Slave device 1300. The SPI Master device 1200 includes functions for issuing commands 1211, and TX/RX FIFO's 1213 for buffering output/input data. The SPI Master device 1200 may also be configured in the manner described above in relation to SPI Master device 200.

In the example embodiment, an SPI slave device 1300 may provide operations for an EEPROM (internal EEPROM 1450 and/or External EEPROM 500 in proxy mode). Core functions for the internal EEPROM 1450, referred to as an Internal EEPROM mode, are provided in Internal EEPROM Slave device 1300. Functions added as firmware may be provided in the SPI slave device 1300. Components within an SPI clock domain (left side of FIG. 7 to the left of the solid vertical line) operate under the SPI clock issued by the SPI Master 1200. The remainder of the components of the Internal EEPROM Slave device 1300 operate under a separate bus clock.

The Internal EEPROM Slave device 1400 includes an AUX Master port 1407, such as a GBX Master port, for access to the internal EEPROM 1450 and the external EEPROM 500. The internal EEPROM 1450 may be a Flash memory device and may be provided on the same chip as the other components of the SPI Slave device 1400. The external EEPROM 500 is a conventional EEPROM that may function as a slave in the proxy mode under control of SPI Master 1200. An external controller (e.g. for the external EEPROM 500) may be accessed by way of an AUX interface 1405, such as an AHB interface. The AUX interface 1405 can access the Register file 1403 and a local RAM 1401 as well as the external EEPROM 500. The Register file

1403 is a configuration file for the on-chip EEPROM and may also include a configuration file for the external EEPROM 500.

Data received or output in the EEPROM Slave device 1300 is performed using an RX FIFO 1413, for receiving data, and a TX FIFO 1415, for outputting data. The RX FIFO stores data that it receives into the local RAM 1401, while the TX FIFO obtains data from the local RAM 1401. Commands being uploaded and data transfer with the TX FIFO 1415 or RX FIFO 1413 may be regulated by MUX 1411.

In order to meet timing requirements of SPI EEPROM, the External EEPROM mode 325 can examine the incoming bitstream and either force certain commands into known-safe states, or allow non-destructive commands to travel through the security device 1300 unmodified. Non-destructive commands are a predetermined set of commands that can be allowed to pass through once a sufficient number of first bits identify the command. Otherwise, the certain commands undergo a command censoring process.

The command dispatch and filtering functions 1320 may include functions for passthrough command filters 1325, which may filter commands issued to the External EEPROM 500 based on programmable rules. As the SPI protocol does not allow commands to be buffered, these commands can be inspected on the fly by the dispatcher 1320 and forwarded to the External EEPROM 500. The command dispatch and filtering functions 1320 may include functions for censoring commands into a dummy read-like command 1327.

The command dispatch and filtering functions 1320 may include Address Mapping and Translation functions 1333. During EEPROM operations, the Address Mapping and Translation functions 1333 map external commands into any of 4 memory components based on address. The memory components may include on-chip RAM 1401, internal EEPROM 1450, External EEPROM 500, and on-chip registers or flip flops.

The command dispatch and filtering functions 1320 may include a command capture function 1331 that may decode commands and external virtual addresses so that the right component is activated for access.

Once the correct components are activated, the command dispatch and filtering functions 1320 may determine the correct return data content and inform the IO module 1310 in what format the data should be streamed to the originating master (normal, dual mode or passthrough).

The IO module 1310 may be an always on component and may be configured to accept external commands during low power and active states. The IO module 1310 can be configured to sample on either positive or negative edge, MSB first or LSB first.

In addition, there may be additional inputs for dual mode and passthrough. Dual mode indicates that for a particular transaction, both MOSI and MISO should be used to output return data, while passthrough indicates the return data can be directly output without security processing. Dual mode and passthrough are not static inputs, but change depending on the type of command that is received from external masters.

IO 1310 operates on the SPI clock and is asynchronous to the on-chip core, EEPROM Slave device 1300, which operates on a bus clock.

The SPI slave device 1300 may directly accesses on-chip memory to satisfy read commands. In order to meet the timing requirements of a SPI normal read command, the command dispatch and filtering functions 1320 can perform a bit rotation operation to gather early bits before making direct memory access.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The security device handles SPI read commands, fast read commands, write commands, status inquiries, and security identification. Read and fast read commands, depending on which address component is mapped, are handled differently. Read commands are performed using a Read Command Module 1351. Read commands to the Internal EEPROM 1450 utilize the memory rotation scheme. Read commands to RAM 1401 can be further subdivided into regions. Read commands intended for the External EEPROM 500 are not affected by the read module.

The fast read command module 1353 may behave the same between on-chip RAM 1401 and Internal EEPROM 1450. The fast read command module 1353 can be separately controlled from read command module 1351 in order to meet different timing states as required by the SPI protocol. In addition, the fast read command module 1353 also may form the basis of other variations of reads such as burst read, index read, and page read.

A burst write control module 1355 can control write commands, a status module 1357 can report status information, and a security identification module 1359 may identify security of a command.

Figure 9:
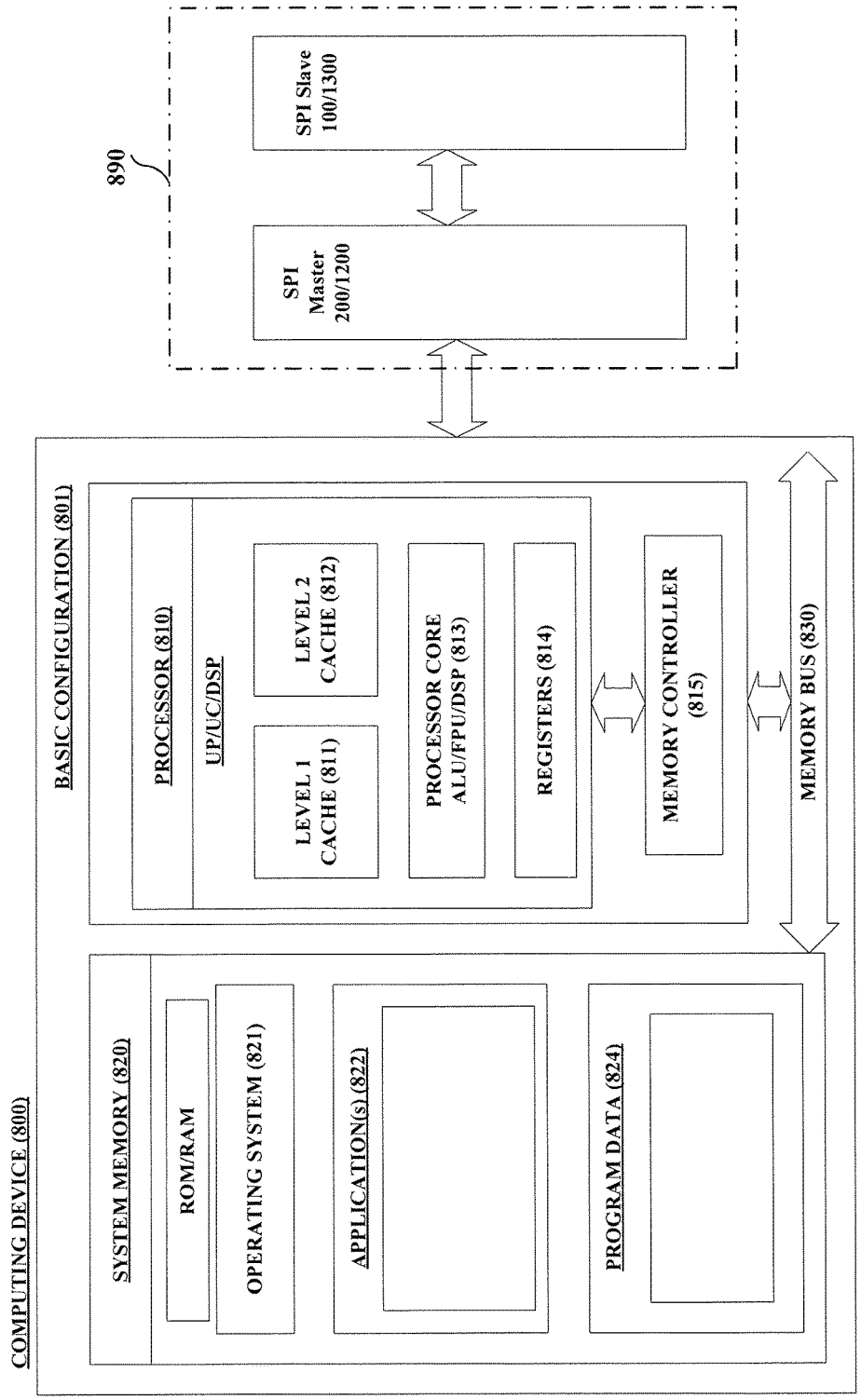
FIG. 9 is a block diagram of a computer with an SPI EEPROM system

FIG. 9 is a high-level block diagram of a conventional computer (800) the operation of which may be improved by the addition of SPI EEPROM 890. It is to be understood that SPI EEPROM 890 does not need to connect to a computer such as computer 800 and may work with other devices/chips such as hard drive controllers, SSD controllers, NICs, etc. The SPI EEPROM 890 may include an SPI master 200 and a SPI EEPROM Slave 100 as described in relation to FIG. 2 or SPI master 1200 and the SPI EEPROM slave 1300 as described in relation to FIG. 7.

In a very basic configuration (801), the computing device (800) typically includes one or more processors (810) and system memory (820). A memory bus (830) can be used for communicating between the processor (810) and the system memory (820).

The SPI EEPROM 890 may be connected to the computing device 800 via an SPI interface. It is to be understood, however, that one of ordinary skill in the art may adapt the SPI EEPROM to connect to computer 800 in various different conventional ways such as direct memory access and USB (Universal Serial Bus). In an alternative, the SPI EEPROM 890 may itself be incorporated into the computing device 800. The dashed lines around the SPI EEPROM 890 indicate optional separate packaging but it is to be understood the SPI EEPROM 890 may be constructed as one or more chips that may be part of the motherboard of computing device 800. All other conventional and to be developed connection and/or integration techniques may be utilized to combine the functionality of the computing device and the SPI EEPROM 890.

Moreover, the SPI EEPROM 890 enables a serial EEPROM device to function as a main non-volatile memory device in a memory system and having faster transfer rates than a conventional EEPROM. Furthermore, combining the SPI EEPROM with a conventional computing device 800 greatly improves the underlying functionality of the combined devices including accelerating reads of the EEPROM(s) 450, 1450, and/or 500. As such the SPI EEPROM 890 provides a technical solution with distinct technical advantages whether or not it is a stand-alone device or used in combination with a computer 800, hard drive controller, SSD controller, NIC, etc.

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (815) can also be used with the processor (810), or in some implementations the memory controller (815) can be an internal part of the processor (810).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more application(s) (822), and program data (824). The application (822) may include programs that request data from an SPI EEPROM 890. Program Data (824) may include storing instructions that requests data from an SPI EEPROM 890.

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of the present disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of accessing data in a non-volatile memory device that includes an internal Electronically Erasable Programmable Read Only Memory (EEPROM) or Flash memory and a buffer memory, the method comprising:

receiving a portion of an associated address of a read command;

determining an address range within the EEPROM or FLASH memory of a plurality of possible associated addresses of the read command based on the received portion of the associated address;

moving memory data for the address range from the EEPROM or FLASH memory into a segment in the buffer memory;

updating a register corresponding to the segment with base and limit values that correspond to the address range;

receiving a remainder of the associated address, effective to receive the associated address;

matching the associated address to the segment based on the base and limit values within the register;

generating a physical address within the buffer memory based on the associated address and an offset contained within the register;

fetching buffer data in the buffer memory based on the physical address; and transmitting a response for the read command including the buffer data.

2. The method of claim 1, wherein the segment is marked as a revolving access segment, wherein the memory data is moved from the internal EEPROM/Flash memory into the segment to fill in where the buffer data is read out of the segment, and when an end of the segment has been reached, the fetching in accordance with the read command continues from a beginning of the segment.

3. The method of claim 1, wherein the segment is marked as an incremental access segment and wherein the memory data is moved from the internal EEPROM/Flash memory into the segment by incrementing the associated address.

4. The method of claim 1, wherein the possible associated addresses are determined based on an address trace performed on a previous associated address that was not matched to any segment within the buffer memory.

5. The method of claim 1, wherein the buffer memory contains a plurality of segments that mirror addresses within the EEPROM or Flash memory, the segment comprising one of the plurality of segments.

6. The method of claim 1, wherein the method is performed by a controller and firmware within the non-volatile memory device.

7. The method of claim 1, further comprising authenticating the read command as a non-destructive command.

8. The method of claim 1, wherein the buffer memory contains non-contiguous pages.

9. The method of claim 1, wherein the non-volatile memory device comprises an EEPROM memory device acting as a Serial Peripheral Interface (SPI) slave device.

10. The method of claim 9, wherein the read command is received from an SPI master device.

11. An Electronically Erasable Programmable Read Only Memory (EEPROM) chip device comprising:
a controller;
non-volatile internal memory;
random access memory (RAM) divided into a plurality of segments;
a plurality of registers, each register storing address information for a respective segment of the plurality of segments; and
computer-readable instructions configured to cause the controller to perform operations comprising:
receiving a portion of an associated address of a read command;
determining an address range within the non-volatile internal memory of a plurality of possible associated addresses of the read command based on the received portion of the associated address;
moving memory data for the address range from the non-volatile internal memory into a segment of the plurality of segments of the RAM;
updating a register of the plurality of registers corresponding to the segment with base and limit values that correspond to the address range;
receiving a remainder of the associated address, effective to receive the associated address;
matching the associated address to the segment based on the base and limit values within the register;
generating a physical address within the RAM based on the associated address and an offset contained within the register;
fetching RAM data in the RAM based on the physical address; and
transmitting a response for the read command including the RAM data.

12. The EEPROM chip device of claim 11, wherein the RAM is a buffer memory for read commands with addresses that map to the non-volatile internal memory.

13. The EEPROM chip device of claim 11, wherein the plurality of segments mirror addresses within the non-volatile internal memory.

14. The EEPROM chip device of claim 11, wherein the operations further comprise performing an address trace on a previous associated address that was not matched to any segment within the RAM; and
wherein the possible associated addresses are based on the address trace.

15. The EEPROM chip device of claim 11, wherein the controller is configured to operate in conjunction with firmware.

16. The EEPROM chip device of claim 11, wherein the operations further comprise authenticating the read command as a non-destructive command.

17. The EEPROM chip device of claim 11, wherein the non-volatile internal memory operates under a dedicated clock.

18. The EEPROM chip device of claim 11, wherein the RAM contains non-contiguous pages.

19. The EEPROM chip device of claim 11, further comprising a Serial Peripheral Interface (SPI), wherein the EEPROM chip device is an SPI slave device.

20. The EEPROM chip device of claim 19, wherein the read command is received from an SPI master device over the SPI interface.

* * * * *